United States Patent [19]
Witty et al.

[11] Patent Number: 6,081,907
[45] Date of Patent: Jun. 27, 2000

[54] DATA DELIVERY SYSTEM AND METHOD FOR DELIVERING DATA AND REDUNDANT INFORMATION OVER A UNIDIRECTIONAL NETWORK

[75] Inventors: Carl R. Witty; Kenneth J. Birdwell; James Randall Sargent, all of Bellevue; Brian Moran, Issaquah, all of Wash.

[73] Assignee: Microsoft Corporation, Redmond, Wash.

[21] Appl. No.: 08/871,657

[22] Filed: Jun. 9, 1997

[51] Int. Cl.[7] .................................................. G06F 11/00
[52] U.S. Cl. ................................. 714/6; 714/752
[58] Field of Search ......................... 395/182.04, 182.09, 395/182.05, 182.14; 370/216, 218, 389, 409; 709/200, 201, 203, 212, 213, 227, 232, 238; 714/6, 18, 20, 716, 717, 761, 762, 755, 752

[56] References Cited

U.S. PATENT DOCUMENTS

| | | | |
|---|---|---|---|
| 4,769,818 | 9/1988 | Mortimer | 714/755 |
| 5,335,277 | 8/1994 | Harvey et al. | 380/20 |
| 5,359,367 | 10/1994 | Stockhill | 348/552 |
| 5,559,808 | 9/1996 | Kostreski et al. | 370/108 |
| 5,565,909 | 10/1996 | Thibadeau et al. | 348/9 |
| 5,625,864 | 4/1997 | Budow et al. | 455/4.2 |
| 5,627,829 | 5/1997 | Gleeson et al. | 370/230 |
| 5,650,831 | 7/1997 | Farwell | 348/734 |
| 5,666,293 | 9/1997 | Metz et al. | 395/200.5 |
| 5,684,807 | 11/1997 | Bianchini et al. | 395/182.02 |
| 5,706,048 | 1/1998 | Davis | 348/12 |
| 5,727,065 | 3/1998 | Dillon | 380/49 |
| 5,727,865 | 3/1998 | Dillon | 380/49 |
| 5,778,187 | 7/1998 | Monteiro et al. | 395/200.61 |
| 5,809,543 | 9/1998 | Byers et al. | 395/182.04 |
| 5,854,897 | 12/1998 | Radziewicz et al. | 395/200.54 |
| 5,859,852 | 1/1999 | Moura et al. | 370/449 |

OTHER PUBLICATIONS

McCarthy, Michael, "VRML 97 Mbone Broadcast Announcement," Feb. 1997.
The Mbone Information Web @ www.mbone.com.
Kashpureff.ORG Network Information Center, "Search Internet Drafts," @ www.kashpureff.org.
R. Panabaker et al. "The Transmission of IP Over the Vertical Blanking Interval Of a Television Signal"—Internet Reference, HTTP://www.microsoft.com, 1997.

Primary Examiner—Robert W. Beausoliel, Jr.
Assistant Examiner—Pierre Eddy Elisea
Attorney, Agent, or Firm—Lee & Hayes, PLLC

[57] ABSTRACT

A data delivery system facilitates transmission of data packets from a content server to multiple clients over a unidirectional network. A redundancy formatter resident at the server groups multiple data packets into a redundancy group and generates at least one redundancy packet containing redundancy information derived from the data packets in the redundancy group. The data packets and redundancy packet are sent over the unidirectional network to the client. In the event that a packet is lost, a packet rebuilder resident at each client reconstructs the missing data packet from the successfully transmitted data packets in the redundancy group and the redundancy packet for the redundancy group.

35 Claims, 7 Drawing Sheets

DATA DELIVERY SYSTEM AND METHOD FOR DELIVERING DATA AND REDUNDANT INFORMATION OVER A UNIDIRECTIONAL NETWORK

TECHNICAL FIELD

This invention relates to a data delivery system in which computer data and other content are served from one or more servers over a unidirectional network to one or more clients. More particularly, this invention relates to a data delivery system and method for delivering redundant information along with the data over the unidirectional network.

BACKGROUND OF THE INVENTION

Conventional computer networks are bi-directional, allowing data communication in both directions between servers and clients. Transmitting data over these bi-directional data networks has been a mainstay of computer technology for many years and the communication protocols are well established. Under conventional communication protocols, it is common for the client to initiate connection with the server and to request desired data from the server. As part of the request, the client sends information pertaining to how the data should be sent. For example, the client might include a client address, TCP port number, and so forth.

Digital data, whether transmitted over a wire-based distribution network (e.g., local area network, wide area network, cable, etc.) or a wireless distribution network (e.g., satellite, RF, paging, etc.), is typically packetized and sent over the network in individual packets. As the data packets are sent, both the server and client carefully track every packet. If a packet is lost during transmission, the server and client contact one another and the lost packet is resent.

Apart from the classic bi-directional data networks, there is an increasing interest in the use of broadcast or multicast networks to deliver computer data and other content to clients. These types of distribution networks are unidirectional in that data flows from the server to the clients, but no return communication is possible over the same communication path. As a result, the broadcast network cannot support the common protocols used for two-way communication over a bi-directional network, such as client-driven connections and data requests, because the clients are unable to communicate over the broadcast communication link to the server.

One problem that arises in the transmission of data packets over a unidirectional network is the occasional loss of data packets during transmission. The absence of a return communication path from the client to the server over the unidirectional network renders it impossible for the client to ask the server to resend the missing packet. As a result, the server blindly sends the packets over the unidirectional network and hopes the client receives all of the sent packets. The problem is amplified in broadcast or multicast environments where the server is sending the packets out to many clients, all of whom may be dropping different data packets.

The inventors have developed a system and method which address this problem.

SUMMARY OF THE INVENTION

A data delivery system facilitates transmission of data packets from a content server to multiple clients over a unidirectional network. A redundancy formatter resident at the server groups multiple data packets into a redundancy group and generates at least one redundancy packet containing redundancy information derived from the data packets in the redundancy group. The data packets and redundancy packet are sent over the unidirectional network to the client. In the event that a packet is lost, a packet rebuilder resident at each client reconstructs the missing data packet from the successfully transmitted data packets in the redundancy group and the redundancy packet for the redundancy group.

According to an aspect of this invention, each packet has a header comprising a unique packet identifier, a content identifier to uniquely identify the data packet as belonging to a particular data transmission, a redundancy group identifier to identify the data packet as belonging to a particular redundancy group, and a redundancy group count of the total number of packets contained within the redundancy group. To protect against loss of multiple packets in a sequence, packets from different redundancy groups are interleaved during transmission over the unidirectional network.

Upon receiving the data and redundancy packets, the client examines the packet headers to gather packets with the same redundancy group identifier. For each redundancy group, the client detects whether any data packet is missing from the redundancy group by comparing the redundancy group count in a packet header with the actual number of gathered packets. If a packet is missing, the client regenerates the missing packet from the other packets in the redundancy group.

According to another aspect of this invention, each data packet is configured with multiple bytes at predefined positions. The redundancy packet is created with multiple bytes which are computationally derived (e.g., using an XOR function) from corresponding bytes in the same byte positions of the data packet bytes. The same computation of corresponding bytes is used to reconstruct a missing packet.

BRIEF DESCRIPTION OF THE DRAWINGS

FIG. 5 shows one example of how a redundancy packet is generated from the multiple data packets.

DETAILED DESCRIPTION OF THE PREFERRED EMBODIMENT

This invention concerns delivery of computer data and other content over a unidirectional network. One or more content servers are connected to serve the data over the unidirectional network to one or more clients. The unidirectional network may be the only distribution means between the server and client, or it may be a single link in a bigger distribution network. Generally, the unidirectional network is a network or link that prohibits a client from contacting the server via the same communication path over which the data is being served.

Figure 1:
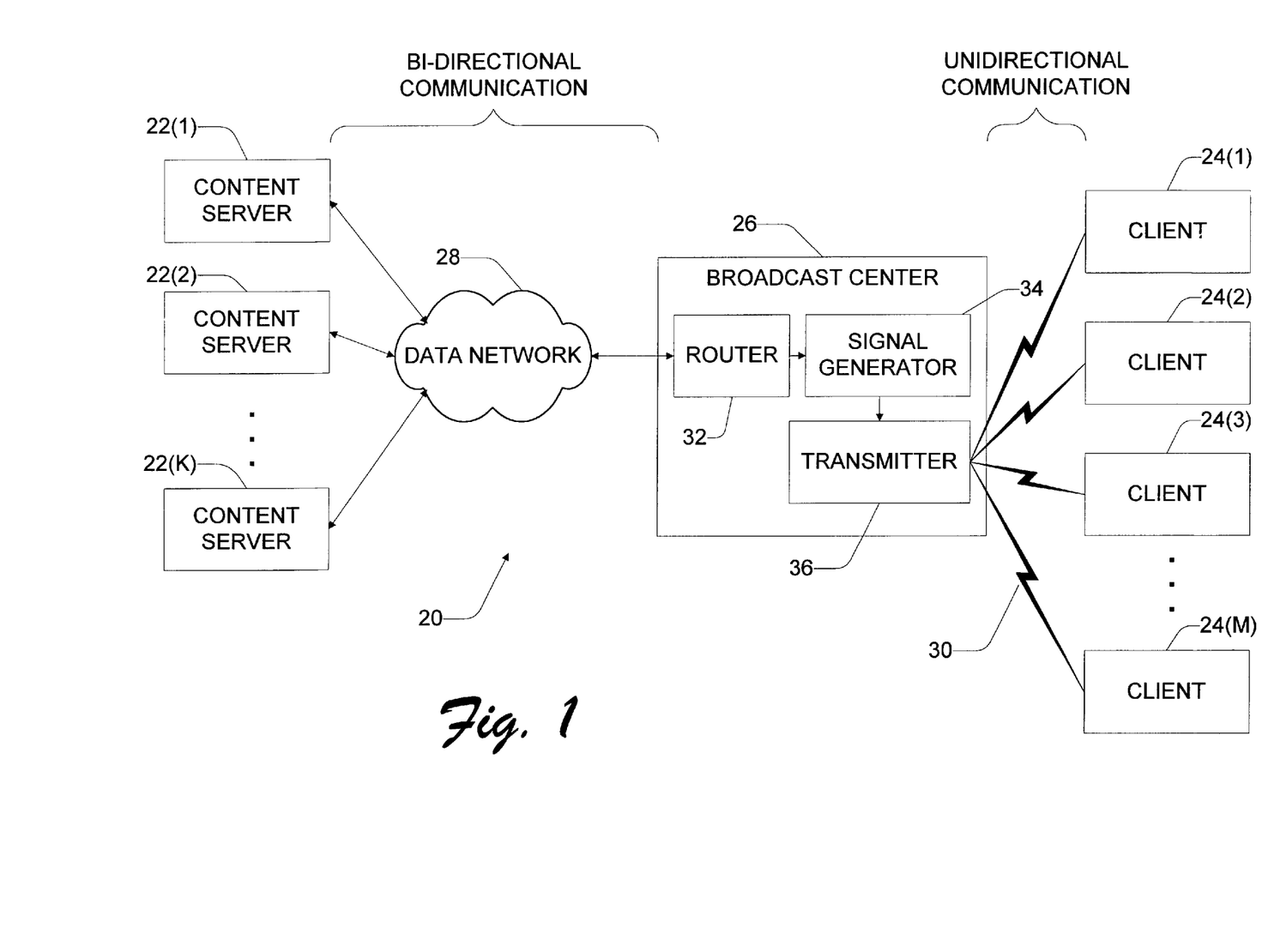
FIG. 1 is a diagrammatic illustration of a data delivery system for sending data packets and redundancy information over a unidirectional network.

FIG. 1 shows an exemplary data delivery system 20 in which computer data and other content is delivered from multiple content servers 22(1), 22(2), ..., 22(K) to multiple clients 24(1), 24(2), 24(3), ..., 24(M). In this implementation, the content servers 22(1)–22(K) are connected to a broadcast center 26 via a bi-directional data network 28 which enables two-way communication between the content servers 22(1)–22(K) and the broadcast center 26. The content servers serve data in the form of audio, video, animation, bit maps or other graphics, applications or other executable code, text, hypermedia, or other multimedia types.

The bi-directional data network 28 represents various types of networks, including the Internet, a LAN (local area network), a WAN (wide area network), and the like. The data network 28 can be implemented in a number of ways, including wire-based technologies (e.g., fiber optic, cable, wire, etc.) and wireless technologies configured for two-way communication (e.g., satellite, RF, etc.). The data network 28 can further be implemented using various available switching technologies (e.g., ATM (Asynchronous Transfer Mode), Ethernet, etc.) and different data communication protocols (e.g., IP, IPX, etc.).

The broadcast center 26 receives the data served from the content servers 22(1)–22(K) over the network 28 and broadcasts the data over a broadcast network 30 to the clients 24(1)–24(M). In the FIG. 1 implementation, the unidirectional network is embodied as the broadcast network 30 in which the data is carried in one direction from the broadcast center 26 to the many clients 24(1)–24(M). The clients are unable to reply or initiate communication to the broadcast center 26 using the broadcast network 30.

The broadcast network 30 can be implemented in a variety of ways. For instance, the broadcast network might be implemented as a wireless network configured for one-way transmission (i.e., satellite, radio, microwave, etc.). The broadcast network might also be a network which supports two-way communication, but is predominately used for unidirectional multicasting from the broadcast center 26 to many clients simultaneously. Although only one broadcast center 26 is illustrated for explanation purposes, the system 20 can scale to include multiple broadcast centers coupled between numerous servers 22 and numerous clients 24.

The broadcast center 26 includes a router 32, a signal generator 34, and a broadcast transmitter 36. The router 32 is coupled to the bi-directional data network 28 to receive the data served over the network 28 from the content servers 22(1)–22(K). The router 32 is a final node of the data network 28 in which data communication is bi-directional to that point and unidirectional past that point. The router 32 is preferably configured as a bridge-router between the traditional data network 28 and the broadcast network 30. A bridge-router is capable of supporting video and audio broadcast transmission.

Data is received at the router 32 and converted from the network packet format to a format appropriate for broadcast transmission. The signal generator 34 generates a broadcast signal with the data embedded thereon to carry the data over the broadcast network 30. The broadcast signal is passed to the transmitter 36 where it is broadcast over the broadcast network 30 to the clients 24(1)–24(M). The clients might still be able to communicate with the broadcast center 26 or content servers 22(1)–22(K) using a different back channel, but this aspect is not shown in the drawings.

Figure 2:
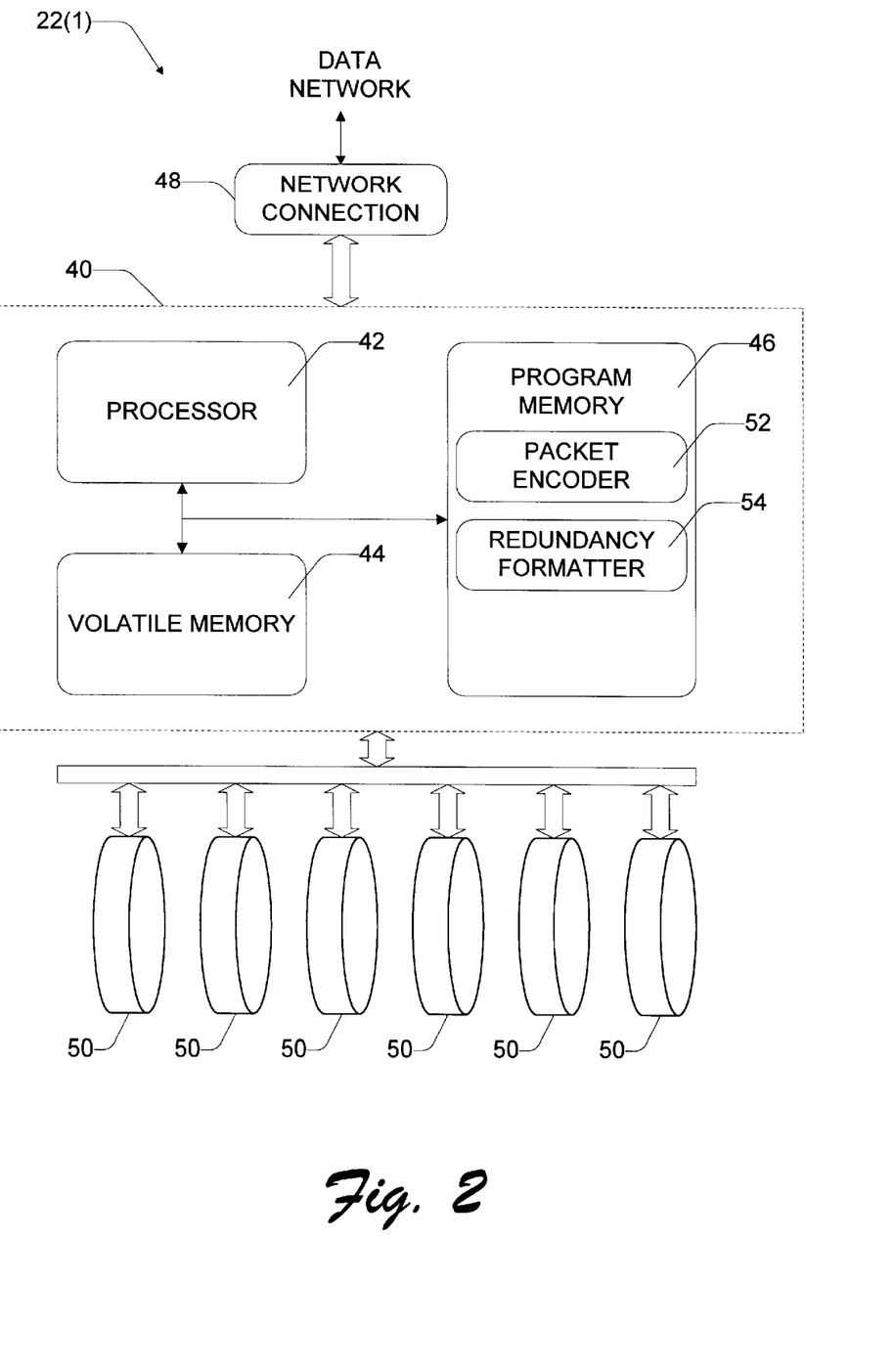
FIG. 2 is a block diagram of a server computing unit.

FIG. 2 shows an exemplary implementation of a content server 22(1). It includes a server computer 40 having a processor 42 (e.g., Pentium® Pro microprocessor from Intel Corporation), volatile memory 44 (e.g., RAM), and program memory 46 (e.g., ROM, disk drive, floppy disk drive, CD-ROM, etc.). The computer 40 is configured, for example, as a personal computer or workstation running a multitasking, disk-based operating system, such as Windows® NT from Microsoft Corporation. The server computer 40 is connected to the data network 28 via a network connection 48. The content server 22(1) has multiple storage disks 50, which might be implemented as a disk array, to store various forms of content. In this illustration, the content server 22(1) is shown configured as continuous media file server which serves data files from a disk array of storage disks 50.

The server 22(1) is illustrated with two software programs: a packet encoder 52 and a redundancy formatter 54. Each program is stored in program memory 46, loaded into volatile memory 44 when launched, and executed on the processor 42. The redundancy formatter 54 groups multiple data packets into a redundancy group and generates at least one redundancy packet containing redundancy information derived from the data packets in the redundancy group. The packet encoder 52 encapsulates packets of data with appropriate headers for transmission over the data network and broadcast network. The operation of the redundancy formatter 54 and packet encoder 52 is described below in more detail with reference to FIGS. 4–6.

With reference again to FIG. 1, the clients 24(1)–24(M) can be implemented in a number of ways, including desktop computers, laptop computers, set-top boxes, and computer enhanced television units. As an example implementation, the client is a broadcast-enabled personal computer.

Figure 3:
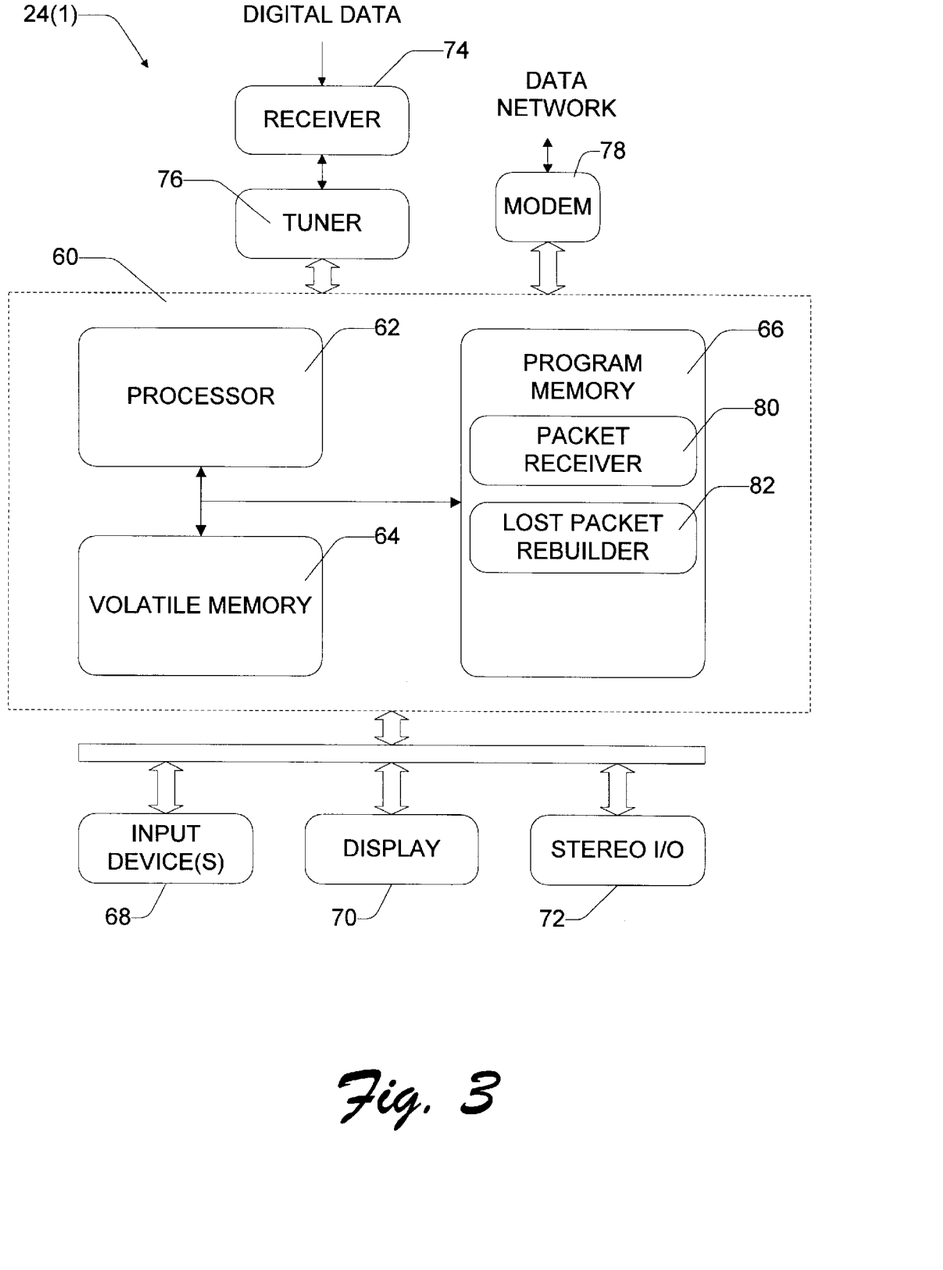
FIG. 3 is a block diagram of a client computing unit.

FIG. 3 shows an exemplary configuration of a client 24(1) implemented as a broadcast-enabled computer. It includes a central processing unit 60 having a processor 62 (e.g., x86 or Pentium® microprocessor from Intel Corporation), volatile memory 64 (e.g., RAM), and program memory 66 (e.g., ROM, disk drive, floppy disk drive, CD-ROM, etc.). The client 24(1) has one or more input devices 68 (e.g., keyboard, mouse, etc.), a computer display 70 (e.g., VGA, SVGA), and a stereo I/O 72 for interfacing with a stereo audio system.

The client 24(1) includes a digital broadcast receiver 74 (e.g., satellite dish receiver, RF receiver, microwave receiver, NTSC-VBI receiver, digital cable TV decoder, etc.) and a tuner 76 which tunes to appropriate frequencies or addresses of the broadcast network 30. The tuner 76 is configured to receive digital broadcast data in a particularized format, such as MPEG-encoded digital video and audio data, as well as digital data in many different forms, including software programs and programming information in the form of data files. The client 24(1) also has a modem 78 which provides dial-up access to the data network to provide a back channel or secondary link to the content servers. In other implementations of a secondary link, the modem 78 might be replaced by a network card, or an RF receiver, or other type of port/receiver which provides access to the secondary link.

The client 24(1) runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems which provide windowing environments may be employed, such as the Macintosh operating system from Apple Computer, Inc. and the OS/2 operating system from IBM.

One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

The client 24(1) is illustrated with two software programs: a packet receiver 80 and a lost packet rebuilder 82. Each program is stored in program memory 66, loaded into volatile memory 64 when launched, and executed on the processor 62. The packet receiver 80 decodes the data packets received by the digital receiver 74. The packet receiver 80 performs various error correction procedures on the packets, obtains information from the headers, and extracts the data payloads for local use. The lost packet rebuilder 82 operates in conjunction with the packet receiver 80 to reconstruct any missing data packet using the successfully transmitted data packets in the missing data packet's redundancy group and the redundancy packet for the redundancy group. The operation of the packet receiver 80 and the lost packet rebuilder 82 is described below in more detail with reference to FIG. 7.

Figure 4:
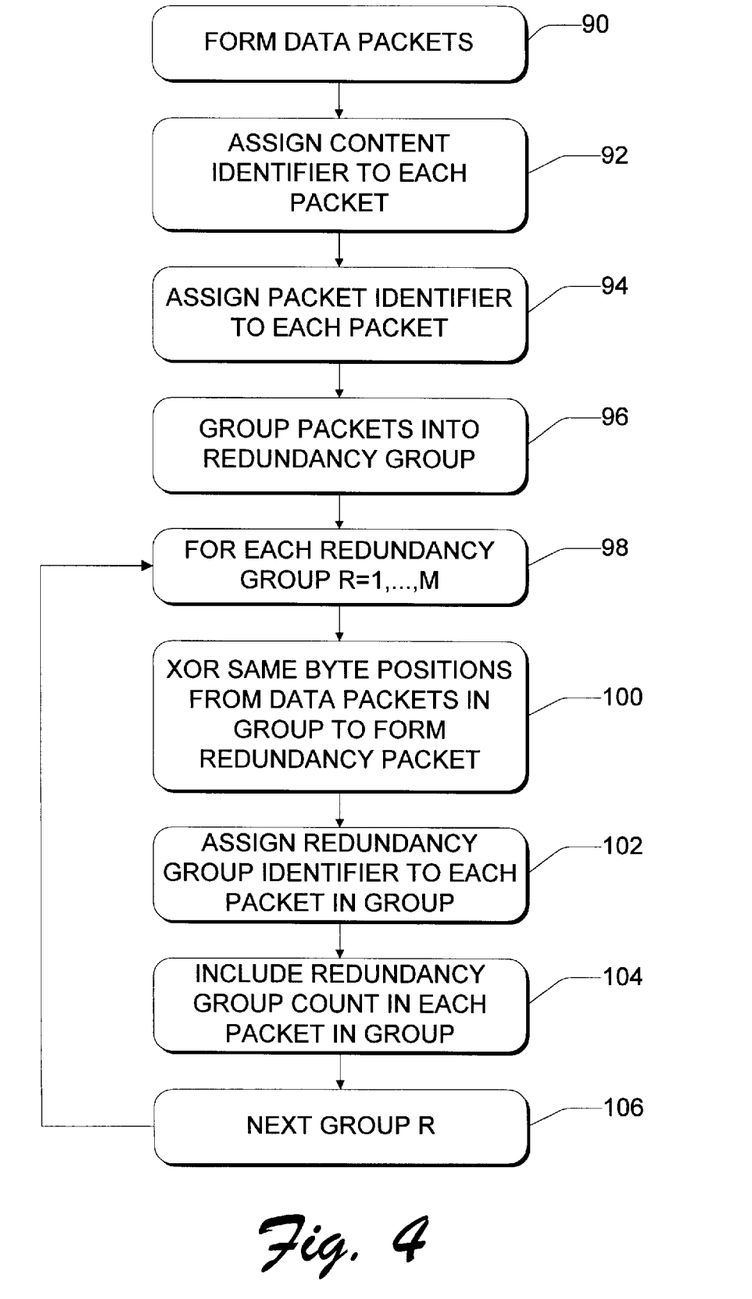
FIG. 4 is a flow diagram showing steps in a method for serving data packets over a unidirectional network.

FIG. 4 shows exemplary steps in a method for serving data packets over the unidirectional network. Software (e.g., packet encoder 52 and redundancy formatter 54) executing at the content servers performs these steps. At step 90, the content server forms individual packets of data. These packets have a finite number of bytes. Preferably, the packets are configured to comply with a multicast data protocol, such as multicast UDP (User Datagram Protocol) which is a standard network protocol.

At step 92 in FIG. 4, the packet encoder 52 assigns a content identifier to each data packet to identify the data packet as belonging to a particular data transmission. The data delivery system is designed to support multiple simultaneous transmissions from different content servers. The content identifiers in the data packets distinguish the data packets from among the different broadcast transmissions. For short data transmissions, the content identifier is a unique value derived from the actual content to be transmitted. A hashing algorithm (e.g., MD5, SHA, etc.) computes a digest of the actual data which is used as the content ID. For longer data transmissions in which it is infeasible to compute a hash of the actual data, the content identifier is a large unique random number that distinguishes packets in one data transmission from packets in other data transmissions.

At step 94 in FIG. 4, the packet encoder 52 assigns a unique packet identifier to each data packet to differentiate individual packets within the same data transmission from one another.

At step 96, the redundancy formatter 54 groups data packets into multiple redundancy groups (e.g., M redundancy groups). The number of redundancy groups varies depending upon the size of the transmission and the anticipated percentage of lost packets. Each redundancy group has multiple data packets. The number of packets in each group also varies according to a number of factors, such as size of transmission, anticipated number of lost packets, redundancy computing efficiency, transmission bandwidth, and so forth.

The redundancy formatter 54 processes each redundancy group (step 98 in FIG. 4) to generate at least one redundancy packet containing redundancy information for that redundancy group. As one example implementation, the redundancy formatter derives a redundancy packet by computing the XOR function of the same byte position from each data packet in the redundancy group (step 100 in FIG. 4).

Figure 5:
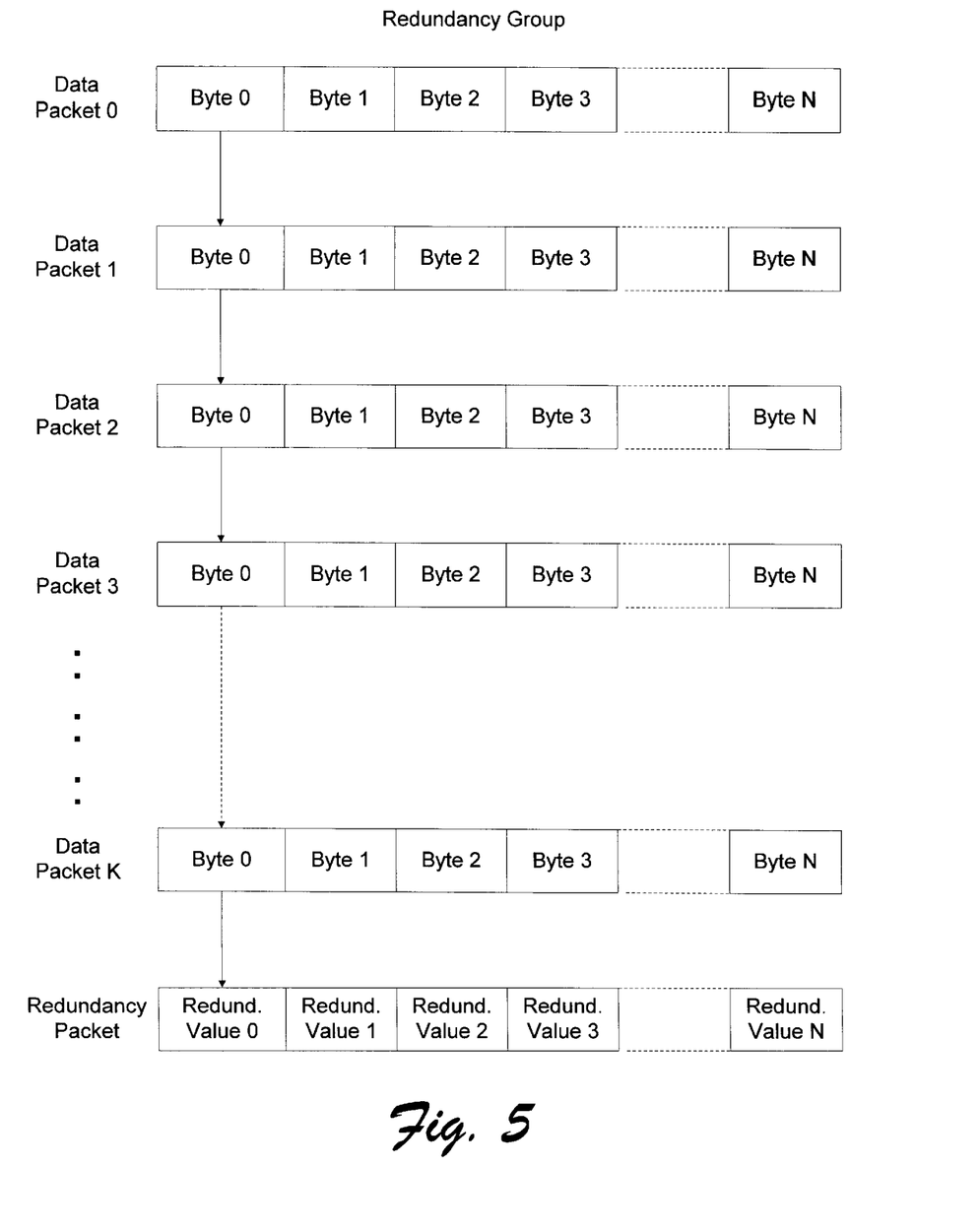
FIG. 5 is a diagrammatic illustration of multiple data packets within a redundancy group.

FIG. 5 shows the byte-wise technique for generating a redundancy packet from multiple data packets within a redundancy group. The illustrated redundancy group has data packets 0, 1, 2, 3, . . . , K. Each data packet has N bytes. The bytes of each data packet correspond to one another by position, with all bytes 0 being present in the first position of their respective data packets, all bytes 1 being present in the second position, and so on. The redundancy formatter 54 computes a redundancy value for each corresponding byte position of the redundancy data packet. The first byte position in the redundancy packet—redundant value 0—is derived by XORing all of the bytes 0 from data packets 0–K. The second byte position in the redundancy packet—redundant value 1—is derived by XORing all of the bytes 1 from data packets 0–K, and so on.

FIG. 5 is illustrated for example purposes. Rather than a byte-wise approach, the redundancy values may be computed using multi-byte words, or an arbitrary segment size. Other computations may be used in place of the XOR function, including Hamming codes, Forward Error Correction codes, etc. Additionally, depending on the error correction or erasure correction algorithm chosen, more than one redundancy packet may be formed for each redundancy group.

With continuing reference to step 102 to FIG. 4, the redundancy formatter 54 assigns a redundancy group identifier to all K data packets within the redundancy group to distinguish those data packets from packets belonging to other redundancy groups. The redundancy packet for the redundancy group is also tagged with the redundancy group identifier. The redundancy group identifier can be a number, alpha string, or other type of indicia that uniquely differentiates packets in different groups. At step 104, the redundancy formatter 54 assigns a redundancy group count to all K data packets and the redundancy packet within the redundancy group. The redundancy group count is the total number of packets (including data and redundancy packets) within the redundancy group, which is this example is K+1. This redundancy group count is used by the receiver to determine if any packets are missing from the redundancy group.

At step 106 in FIG. 4, the redundancy formatter 54 proceeds to the next redundancy group to generate a redundancy packet based on the data packets within that redundancy group and to mark all packets with the appropriate identifiers.

As each redundancy group is completed, or after the entire data transmission is encoded, the packets are served over the unidirectional network to the clients. Both the data packets and the redundancy packets are sent. Typically, any lost data packets are lost in bursts during the broadcast transmission. To minimize loss of multiple packets in a sequence, data packets from different redundancy groups are interleaved. The data packets are often interleaved naturally as a product of simultaneous multicast of entirely different content served over the unidirectional network from different servers. The content identifiers and redundancy group identifiers are used by the clients to distinguish the packets, as is described below in more detail.

Figure 6:
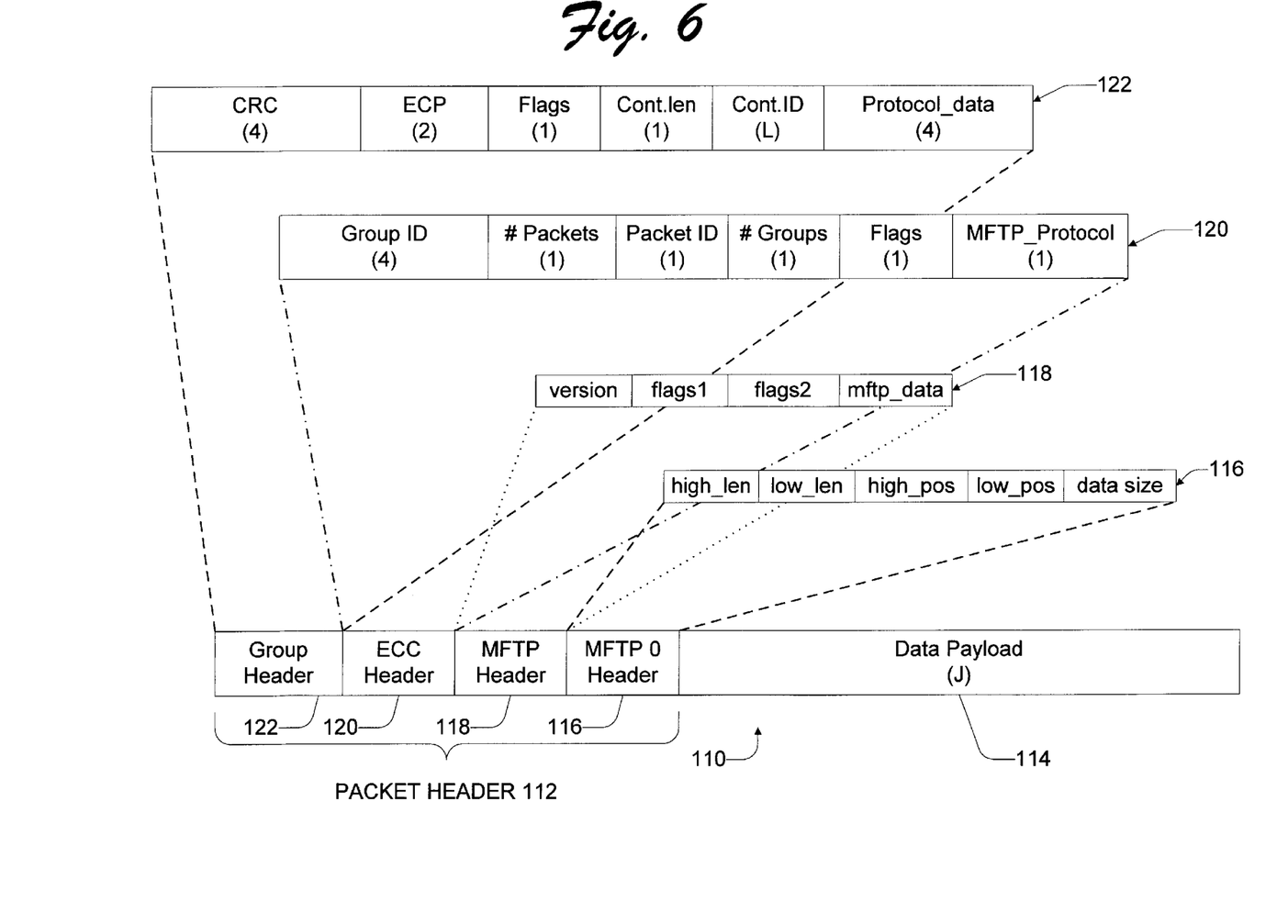
FIG. 6 is a diagrammatic illustration of a data packet structure.

FIG. 6 shows an exemplary data structure 110 for a data packet formed by the packet encoder 52 and redundancy formatter 54. The data structure 110 has a header 112 and a data payload 114 concatenated together. The data payload 112 holds J bytes of actual data content, where the number J depends upon the transmission protocol.

The header 112 includes two MFTP (Multi File Transport Protocol) headers 116 and 118, an error correction protocol header 120, and a group header 122. The first MTFP header 116 is attached to the data packet 114. The MTFP header 116 contains a four-byte field "high_len" which stores the high order 32 bits of total data length; a four-byte field "low_len" which holds the low order 32 bits of total data length; a four-byte field "high_pos" which holds the high order 32 bits of current data position; a four-byte field "low_pos" which holds the low order 32 bits of current data position; and a one-byte field "data_size" indicating the size of the attached data payload 114.

The second MFTP header 118 is wrapped around the data payload 114 and first MFTP header 116. The second MFTP header 118 contains a one-byte field "version" which identifies the current version of the MFTP protocol; a one-byte field "flags1" of undefined flags; a two-byte field "flags2" of undefined flags; and a one-byte field "mftp_data" which holds data for specific MFTP protocol.

Following the two MFTP headers, the packet is further wrapped with an ECC header 120 provided by the redundancy formatter 54. The ECC header contains information pertaining to the XOR ECC protocol used to develop the redundancy packet. The ECC header 120 contains a four-byte redundancy group ID field to identify the packet as belonging to a particular redundancy group. The ECC header 120 further includes a one-byte field which holds the redundancy group count. This count specifies the total number of packets contained within the redundancy group identified by the group ID field. A one-byte packet ID field contains the packet identifier which is unique for each packet. The remaining fields of the ECC header 120 are a one-byte field to hold the number of different redundancy groups that are interleaved; a one-byte field of undefined flags; and a one-byte field for MFTP protocol information.

The first three headers 116–120 are unique to each packet, as the values within the headers change from packet to packet.

The group header 122, which wraps the data payload 114 and previous headers 116–120, is common for all packets within the same transmission. The group header 12 contains a four-byte CRC field which contains CRC (cyclical redundancy check) information for the entire packet. The group header 122 contains a two-byte ECP field which specifies the error correction protocol used to derive the redundancy packet and form the ECC header 120. A one-byte "flags" field is presently unused, but may be defined later. A one-byte "cont.len" field specifies the length of the content identifier, which is held in the neighboring L-byte "cont.ID" field. As described above, the content identifier stored in the cont.ID field is a hash digest or other unique representation of the actual data content of the entire data transmission. The last field is a four-byte field which contains protocol-related information.

Figure 7:
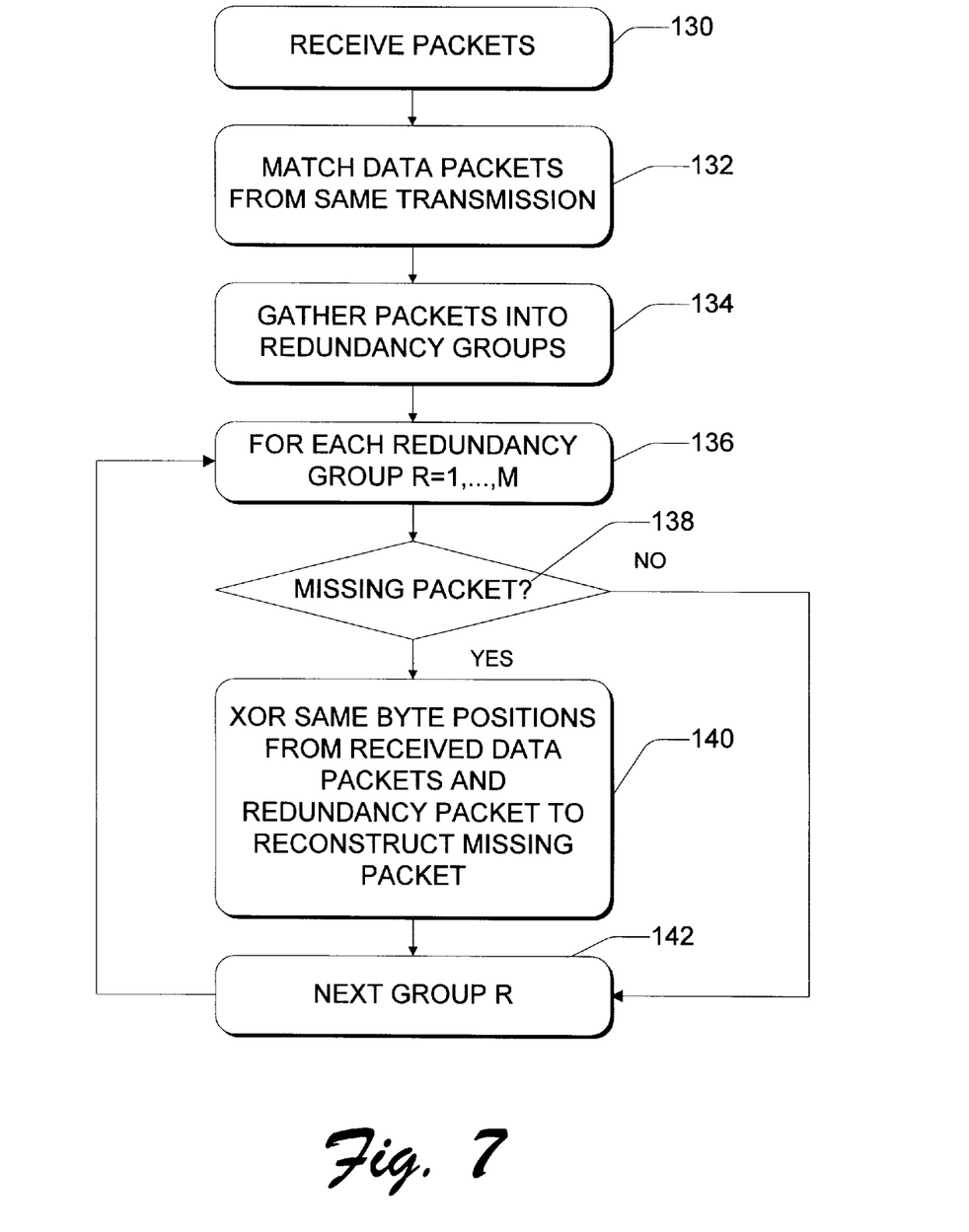
FIG. 7 is a flow diagram showing steps in a method for receiving data packets transmitted over a unidirectional network.

FIG. 7 shows exemplary steps in a method for receiving data packets transmitted over a unidirectional network. Software (e.g., packet receiver 80 and lost packet rebuilder 82) executing at the clients performs these steps. At step 130, the client receives the packets from the unidirectional network. The client is configured to handle the multicast data protocol, such as multicast UDP. At step 132, the packet receiver 80 examines the group header 122 and matches data packets having the same content identifier. This process separates the data packets into their respective transmissions.

At step 134 in FIG. 7, the packet receiver 80 examines the ECC header 120 and gathers packets with the same redundancy group identifier. This process differentiates packets within the same transmission according to their redundancy group.

Once the packets are gathered into redundancy groups, the lost packet rebuilder 82 examines each redundancy group (step 136 in FIG. 7). For each redundancy group, the lost packet rebuilder 82 examines the ECC headers 120 of the packets to detect if any packet is missing (step 138 in FIG. 7). The ECC header 120 contains the redundancy group count specifying the number of packets contained within the redundancy group. The lost packet rebuilder 82 detects whether any data packet is missing from a particular redundancy group by comparing the redundancy group count in the ECC headers with the actual number of packets received from the unidirectional network. If no packet is missing (i.e., the "no" branch from step 138), the lost packet rebuilder 82 continues to the next redundancy group (step 142).

Conversely, if a packet is missing (i.e., the "yes" branch from step 138), the lost packet rebuilder 82 reconstructs the missing data packet using the successfully received data packets and the redundancy packet of the corresponding redundancy group (step 140 in FIG. 7). More particularly, the same XOR function is computed for each byte position of the available packets to reconstruct the bytes of the missing packet. The lost packet rebuilder 82 might optionally attempt to determine which data packet is missing based on the unique packet identifiers of the received packets. After the data packet is recovered, the lost packet rebuilder proceeds to the next redundancy group (step 142).

When using the XOR function, only one packet from each redundancy group can be lost and regenerated. When two or more packets are lost from the same redundancy group, the packets cannot be recovered using the XOR function. Accordingly, if a high percentage of packets are expected to be lost during a transmission, the server may decide to form a greater number of redundancy groups, with each group having a smaller number of packets. In this manner, there is much less chance of losing multiple packets per group.

With other functions, however, more than one packet may be lost without loss of data content. For example, using Hamming codes and related FEC algorithms, multiple lost packets can be reconstructed depending on the amount of redundant information sent (assuming uncompressible data content the ratio of redundant data required to lost packet recovery will be at least 1 to 1).

In compliance with the patent statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for sending data packets over a unidirectional network, comprising the following steps:
   grouping multiple data packets into a redundancy group;
   forming at least one redundancy packet containing redundancy information generated from the data packets in the redundancy group; and
   sending the data packets and the redundancy packet over the unidirectional network.

2. A method as recited in claim 1, wherein each data packet has multiple bytes, and further comprising the step of generating the redundancy packet to include multiple bytes which correspond to the multiple bytes of the data packets, each byte in the redundancy packet containing redundancy information that is computationally derived from the corresponding bytes in each of the data packets within the redundancy group.

3. A method as recited in claim 1, wherein each data packet has multiple bytes, and further comprising the step of generating the redundancy packet to include multiple bytes which correspond to the multiple bytes of the data packets, each byte in the redundancy packet containing redundancy information that is computationally derived according to an XOR function of the corresponding bytes in each of the data packets within the redundancy group.

4. A method as recited in claim 1, further comprising the step of assigning a redundancy group identifier to every data packet within the redundancy group to identify the data packets as belonging to the redundancy group.

5. A method as recited in claim 1, further comprising the step of assigning a unique packet identifier to each data packet within the redundancy group.

6. A method as recited in claim 1, further comprising the step of assigning a content identifier to each data packet to identify the data packet as belonging to a particular data transmission.

7. A method as recited in claim 1, further comprising the following steps:
   receiving the data packets and redundancy packet;
   reconstructing any data packet from the redundancy group using the received data packets and the redundancy packet.

8. A method as recited in claim 1, further comprising the following steps:
   forming multiple redundancy groups, each redundancy group having multiple data packets and at least one redundancy packet;
   interleaving data packets from different ones of the redundancy groups prior to sending the data packets over the unidirectional network.

9. A computer-readable medium having computer-executable instructions for performing the steps of the method as recited in claim 1.

10. A computer programmed to perform the steps of the method as recited in claim 1.

11. A method for serving multiple data packets for a data transmission over a unidirectional network, comprising the following steps:
    assigning a content identifier to each data packet to identify the data packet as belonging to the data transmission;
    assigning a unique packet identifier to each data packet;
    grouping the data packets into multiple redundancy groups, each redundancy group having multiple data packets;
    assigning a redundancy group identifier to every data packet within a particular redundancy group to identify the data packets as belonging to the particular redundancy group;
    forming at least one redundancy packet for associated ones of the redundancy groups, the redundancy packet containing redundancy information generated from the data packets in the associated redundancy group; and
    assigning a redundancy group count to each data packet within the particular redundancy group to represent a total number of packets within the particular redundancy group.

12. A method as recited in claim 11, wherein each data packet has multiple bytes, and further comprising the step of generating the redundancy packet for each redundancy group to include multiple bytes which correspond to the multiple bytes of the data packets in the redundancy group, each byte in the redundancy packet containing redundancy information that is computationally derived from the corresponding bytes in each of the data packets within the redundancy group.

13. A method as recited in claim 11, wherein each data packet has multiple bytes, and further comprising the step of generating the redundancy packet for each redundancy group to include multiple bytes which correspond to the multiple bytes of the data packets in the redundancy group, each byte in the redundancy packet containing redundancy information that is computationally derived according to an XOR function of the corresponding bytes in each of the data packets within the redundancy group.

14. A method as recited in claim 11, further comprising the step of sending the data packets and the redundancy packets over the unidirectional network.

15. A method as recited in claim 11, further comprising the following steps:
    interleaving data packets from different ones of the redundancy groups; and
    sending the interleaved data packets along with the redundancy packets over the unidirectional network.

16. A computer-readable medium having computer-executable instructions for performing the steps of the method as recited in claim 11.

17. A computer programmed to perform the steps of the method as recited in claim 11.

18. A method for handling data packets transmitted over a unidirectional network, comprising the following steps:
    receiving data packets carried over the unidirectional network, the data packets belonging to various redundancy groups;
    receiving redundancy packets carried over the unidirectional network, the redundancy packets belonging to the various redundancy groups and containing redundancy information generated from the data packets in associated redundancy groups;
    gathering the data packets and the redundancy packets into respective ones of the redundancy groups;
    checking each redundancy group to determine if any of the data packets are missing; and
    in an event that a particular data packet is missing from a particular redundancy group, reconstructing the particular data packet from remaining ones of the data packets in the particular redundancy group and the redundancy packet for the particular redundancy group.

19. A method as recited in claim 18, wherein each data packet has a redundancy group identifier to identify the data packet as belonging to one of the redundancy groups, and said gathering step comprises gathering the data packets with like redundancy group identifiers to form the redundancy groups.

20. A method as recited in claim 18, wherein each data packet has a redundancy group count to represent a total number of packets contained within the redundancy group to which the data packet belongs, and said checking step comprises the step of detecting whether any data packet is missing from the particular redundancy group by comparing the redundancy group count in one of the data packets within the particular redundancy group with an actual number of packets gathered for the particular redundancy group.

21. A method as recited in claim 18, wherein each data packet has a unique packet identifier, and further comprising the step of determining which data packet is missing from the particular redundancy group.

22. A method as recited in claim 18, wherein each data packet and each redundancy packet has multiple bytes arranged in predefined positions so that byte positions within the redundancy packet correspond to byte positions within the data packet, and said reconstructing step comprises computationally deriving bytes in the particular data packet that is missing from the corresponding bytes in each of the remaining data packets and the redundancy packet within the particular redundancy group.

23. A method as recited in claim 18, wherein each data packet and each redundancy packet has multiple bytes arranged in predefined locations so that byte positions within the redundancy packet correspond to byte positions within the data packet, and said reconstructing step comprises XORing the corresponding bytes in each of the remaining data packets and the redundancy packet within the particular redundancy group to regenerate the bytes in the particular data packet that is missing.

24. A computer-readable medium having computer-executable instructions for performing the steps of the method as recited in claim 18.

25. A computer programmed to perform the steps of the method as recited in claim 18.

26. In a data delivery system for sending data packets from a server to a client over a unidirectional network, the client and the server each having a computer-readable medium, the computer-readable media on the server and the client having computer-executable instructions for performing steps comprising:
   grouping multiple data packets into a redundancy group at the server;
   generating at least one redundancy packet containing redundancy information derived from the data packets in the redundancy group;
   sending the data packets and the redundancy packet over the unidirectional network; and
   reconstructing at the client any data packet missing from the redundancy group using remaining ones of the data packets in the redundancy group and the redundancy packet for the redundancy group.

27. Computer-readable media having computer-executable instructions as recited in claim 26, further comprising computer-executable instructions to perform steps of forming multiple redundancy groups, each redundancy group having multiple data packets and at least one redundancy packet, and interleaving data packets from different ones of the redundancy groups at the server prior to sending the data packets over the unidirectional network.

28. A data delivery system for sending data packets from a server to a client over a unidirectional network, comprising:
   a redundancy formatter located at the server, the redundancy formatter grouping multiple data packets into a redundancy group and generating at least one redundancy packet containing redundancy information derived from the data packets in the redundancy group; and
   a packet rebuilder located at the client, the packet rebuilder reconstructing any data packet missing from the redundancy group using remaining ones of the data packets in the redundancy group and the redundancy packet for the redundancy group.

29. A data delivery system as recited in claim 28, wherein each data packet has multiple bytes at predefined positions within the packet, the redundancy formatter generating the redundancy packet to include multiple bytes which correspond in position to the bytes of the data packets, each byte in the redundancy packet containing redundancy information that is computationally derived from the corresponding bytes in each of the data packets within the redundancy group.

30. A data delivery system as recited in claim 28, wherein each data packet has multiple bytes at predefined positions within the packet, the redundancy formatter generating the redundancy packet to include multiple bytes which correspond in position to the bytes of the data packets, each byte in the redundancy packet containing redundancy information that is computationally derived according to an XOR function of the corresponding bytes in each of the data packets within the redundancy group.

31. A data delivery system as recited in claim 28, wherein each data packet comprises a redundancy group identifier to identify the data packet as belonging to the redundancy group.

32. A data delivery system as recited in claim 28, wherein each data packet comprises a unique packet identifier.

33. A data delivery system as recited in claim 28, wherein each data packet comprises a content identifier to identify the data packet as belonging to a particular data transmission.

34. A data delivery system as recited in claim 28, wherein the redundancy formatter forms multiple redundancy groups, with each redundancy group having multiple data packets and at least one redundancy packet, the redundancy formatter interleaving data packets from different ones of the redundancy groups prior to transmission over the unidirectional network to the client.

35. A computer-readable memory having a packet structure for a data packet to be carried by a unidirectional network as part of a data transmission, the data packet belonging to a group of data packets, the network packet structure comprising:
   a header comprising:
      a packet identifier field to uniquely identify the data packet;
      a content identifier field to uniquely identify the data packet as belonging to a particular data transmission;
      a redundancy group identifier field to identify the packet as belonging to a redundancy group of data packets, the redundancy group comprising multiple data packets and at least one redundancy packet derived from the data packets;
      a redundancy group count to represent a total number of the packets contained within the redundancy group to which the data packet belongs; and
   a data payload joined to the header to hold the data of the data packet.

* * * * *